US010791002B2

(12) United States Patent
de Haas et al.

(10) Patent No.: US 10,791,002 B2
(45) Date of Patent: Sep. 29, 2020

(54) CONTROLLER AREA NETWORK (CAN) DEVICE AND METHOD FOR OPERATING A CAN DEVICE

(71) Applicant: NXP B.V., Eindhoven (NL)

(72) Inventors: Clemens Gerhardus Johannes de Haas, Ewijk (NL); Matthias Berthold Muth, Ewijk (NL)

(73) Assignee: NXP B.V., Eindhoven (NL)

(*) Notice: Subject to any disclaimer, the term of this patent is extended or adjusted under 35 U.S.C. 154(b) by 290 days.

(21) Appl. No.: 15/681,363

(22) Filed: Aug. 19, 2017

(65) Prior Publication Data
US 2019/0058614 A1 Feb. 21, 2019

(51) Int. Cl.
| | | |
|---|---|---|
| *H04L 12/40* | (2006.01) | |
| *H04L 12/417* | (2006.01) | |
| *H04L 29/06* | (2006.01) | |
| *H04L 12/933* | (2013.01) | |
| *G06F 13/40* | (2006.01) | |
| *H04L 25/02* | (2006.01) | |
| *H04L 25/03* | (2006.01) | |

(52) U.S. Cl.
CPC .. *H04L 12/40045* (2013.01); *H04L 12/40032* (2013.01); *H04L 12/417* (2013.01); *H04L 49/102* (2013.01); *H04L 69/18* (2013.01); *G06F 13/4072* (2013.01); *H04L 25/0272* (2013.01); *H04L 25/0278* (2013.01); *H04L 25/0286* (2013.01); *H04L 25/03834* (2013.01); *H04L 2012/40215* (2013.01); *H04L 2012/40267* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 6,307,402 | B1* | 10/2001 | Hedberg | .......... H03K 19/01857 326/115 |
| 8,593,202 | B2 | 11/2013 | Mori et al. | |
| 9,178,764 | B2 | 11/2015 | Hartwich et al. | |

(Continued)

FOREIGN PATENT DOCUMENTS

| | | |
|---|---|---|
| DE | 102010043484 A1 | 5/2012 |
| JP | 5498527 B2 | 5/2014 |

(Continued)

OTHER PUBLICATIONS

U.S. Appl. No. 15/412,556, filed Jan. 23, 2017.
U.S. Appl. No. 15/412,659, filed Jan. 23, 2017.
International Application No. EP 17159590.3, filed Mar. 7, 2017.

*Primary Examiner* — Paul Yen
(74) *Attorney, Agent, or Firm* — Rajeev Madnawat (57) ABSTRACT

Embodiments of a method, a device and a computer-readable storage medium are disclosed. In an embodiment, a method for operating a Controller Area Network (CAN) device involves detecting a transition of a CAN transceiver of the CAN device from a dominant state to a recessive state and in response to detecting a transition of the CAN transceiver from the dominant state to the recessive state, controlling an output impedance of the CAN transceiver to be within a predefined range of an impedance value at the dominant state while a differential driver voltage on a CAN bus connected to the CAN transceiver decreases to a predefined voltage.

19 Claims, 8 Drawing Sheets

(56) References Cited

U.S. PATENT DOCUMENTS

| | | | |
|---|---|---|---|
| 2009/0028226 A1* | 1/2009 | Bliss | G06F 13/4077 |
| | | | 375/220 |
| 2009/0096587 A1* | 4/2009 | Finkenzeller | G06K 7/0008 |
| | | | 340/10.34 |
| 2010/0124298 A1 | 5/2010 | Jang | |
| 2011/0293036 A1* | 12/2011 | Ishimaru | H04L 25/0278 |
| | | | 375/295 |
| 2014/0077879 A1* | 3/2014 | Naeini | H03F 1/086 |
| | | | 330/255 |
| 2014/0156893 A1 | 6/2014 | Monroe et al. | |
| 2016/0036604 A1 | 2/2016 | Mori et al. | |

FOREIGN PATENT DOCUMENTS

| | | |
|---|---|---|
| JP | 5543402 B2 | 7/2014 |
| WO | 2015011515 A1 | 1/2015 |

\* cited by examiner

CONTROLLER AREA NETWORK (CAN) DEVICE AND METHOD FOR OPERATING A CAN DEVICE

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO 11898-1:2015 standard, can provide higher data rates.

A CAN bus network may include multiple CAN nodes located at varying distances to terminating impedances at end CAN nodes. CAN nodes furthest from the terminating impedances may cause reflection/ringing on the CAN bus, which can reduce the maximum data rate at which the bus may operate correctly. Traditionally, other factors such as the length of the CAN bus cable, limit the data rate to a speed below the speed at which reflection would become an issue. However, advancement in the CAN bus protocol, for example, CAN FD have increased the possible data rate to a point at which reflection may negatively impact the performance of the CAN bus network.

SUMMARY

Embodiments of a method, a device and a computer-readable storage medium are disclosed. In an embodiment, a method for operating a Controller Area Network (CAN) device involves detecting a transition of a CAN transceiver of the CAN device from a dominant state to a recessive state and in response to detecting a transition of the CAN transceiver from the dominant state to the recessive state, controlling an output impedance of the CAN transceiver to be within a predefined range of an impedance value at the dominant state while a differential driver voltage on a CAN bus connected to the CAN transceiver decreases to a predefined voltage.

In an embodiment, detecting a transition of the CAN transceiver from the dominant state to the recessive state involves monitoring a transmit data connection (TXD) signal received at the CAN transceiver.

In an embodiment, monitoring the TXD signal received at the CAN transceiver involves identifying a signal edge of the TXD signal.

In an embodiment, monitoring the TXD signal received at the CAN transceiver involves receiving the TXD signal from a microcontroller within the CAN device.

In an embodiment, controlling the output impedance of the CAN transceiver to be within the predefined range of the impedance value at the dominant state while the differential driver voltage on the CAN bus decreases to the predefined voltage involves in response to detecting a transition of the CAN transceiver from the dominant state to the recessive state, controlling the output impedance of the CAN transceiver to be within a certain percentage above or below the impedance value at the dominant state while the differential driver voltage on the CAN bus decreases to the predefined voltage.

In an embodiment, controlling the output impedance of the CAN transceiver to be within the certain percentage above or below the impedance value at the dominant state while the differential driver voltage on the CAN bus decreases to the predefined voltage involves in response to detecting a transition of the CAN transceiver from the dominant state to the recessive state, controlling the output impedance of the CAN transceiver to be equal to the impedance value at the dominant state while the differential driver voltage on the CAN bus decreases to the predefined voltage.

In an embodiment, controlling the output impedance of the CAN transceiver to be within the predefined range of the impedance value at the dominant state while the differential driver voltage on the CAN bus connected to the CAN transceiver decreases to the predefined voltage involves in response to detecting a transition of the CAN transceiver from the dominant state to the recessive state, controlling an impedance of an impedance bridge within the CAN transceiver to be within a predefined range of an impedance value at the dominant state while the differential driver voltage on the CAN bus decreases to the predefined voltage.

In an embodiment, controlling the impedance of the impedance bridge within the CAN transceiver to be within the predefined range of the impedance value at the dominant state while the differential driver voltage on the CAN bus decreases to the predefined voltage involves in response to detecting a transition of the CAN transceiver from the dominant state to the recessive state, controlling resistance values of a plurality of adjustable push resistors and a plurality of adjustable pull resistors of the impedance bridge within the CAN transceiver to be within a predefined range of an impedance value at the dominant state while the differential driver voltage on the CAN bus decreases to the predefined voltage.

In an embodiment, the impedance bridge includes two legs. Each of the two legs includes an adjustable pull resistor and an adjustable push resistor connected in series and to a respective one of two CAN bus terminals of the CAN transceiver.

In an embodiment, the impedance bridge includes two legs. Each of the two legs includes an adjustable pull resistor and an adjustable push resistor connected in series between a voltage supply rail and a ground rail and to a respective one of two CAN bus terminals of the CAN transceiver.

In an embodiment, the method further involves increasing the output impedance of the CAN transceiver a constant change rate while the differential driver voltage on the CAN bus connected to the CAN transceiver is kept at the predefined voltage.

In an embodiment, increasing the output impedance of the CAN transceiver while the differential driver voltage on the CAN bus connected to the CAN transceiver is kept at the predefined voltage involves increasing the output impedance of the CAN transceiver to be equal to a characteristic impedance of the CAN bus or to a predefined impedance value while the differential driver voltage on the CAN bus is kept at the predefined voltage.

In an embodiment, increasing the output impedance of the CAN transceiver to be equal to the characteristic impedance of the CAN bus or to the predefined impedance value while the differential driver voltage on the CAN bus connected to the CAN transceiver is kept at the predefined voltage involves increasing the output impedance of the CAN transceiver to be equal to the characteristic impedance of the CAN bus or to the predefined impedance value before a data sample point while the differential driver voltage on the CAN bus is kept at the predefined voltage.

In an embodiment, increasing the output impedance of the CAN transceiver while the differential driver voltage on the CAN bus connected to the CAN transceiver is kept at the predefined voltage involves increasing the output impedance of the CAN transceiver to be equal to a characteristic impedance of the CAN bus while the differential driver voltage on the CAN bus is kept at the predefined voltage and subsequently, increasing the output impedance of the CAN transceiver from the characteristic impedance of the CAN bus to a high ohmic value while the differential driver voltage on the CAN bus is kept at the predefined voltage.

In an embodiment, a CAN device includes an impedance bridge connected to two CAN bus terminals of the CAN device and an impedance controller connected to the impedance bridge. The impedance controller is configured to detect a transition of a CAN transceiver of the CAN device from a dominant state to a recessive state and in response to detecting a transition of the CAN transceiver from the dominant state to the recessive state, control an output impedance of the impedance bridge to be within a predefined range of an impedance value at the dominant state while a differential driver voltage on a CAN bus connected to the CAN transceiver decreases to a predefined voltage.

In an embodiment, the impedance controller is further configured to identify a signal edge of a transmit data connection (TXD) signal received at the CAN transceiver.

In an embodiment, the impedance bridge includes two legs. Each of the two legs includes an adjustable pull resistor and an adjustable push resistor connected in series between a voltage supply rail and a ground rail and to a respective one of the two CAN bus terminals.

In an embodiment, the impedance controller is further configured to increase the output impedance of the impedance bridge to be equal to a characteristic impedance of the CAN bus while the differential driver voltage on the CAN bus is kept at the predefined voltage and subsequently, increase the output impedance of the impedance bridge from the characteristic impedance of the CAN bus to a high ohmic value while the differential driver voltage on the CAN bus is kept at the predefined voltage.

In an embodiment, the impedance controller is further configured to increase the output impedance of the impedance bridge to be equal to a predefined impedance value that is with a certain range of a characteristic impedance of the CAN bus before a data sample point while the differential driver voltage on the CAN bus is kept at the predefined voltage.

In an embodiment, a non-transitory computer-readable storage medium stores program instructions for operating a Controller Area Network (CAN) device. Execution of the program instructions by one or more processors of a computer system causes the one or more processors to perform steps including detecting a transition of a CAN transceiver of the CAN device from a dominant state to a recessive state and in response to detecting a transition of the CAN transceiver from the dominant state to the recessive state, controlling an output impedance of the CAN transceiver to be within a predefined range of an impedance value at the dominant state while a differential driver voltage on a CAN bus connected to the CAN transceiver decreases to a predefined voltage.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of networks, including, for example, a Controller Area Network (CAN), a Local Interconnect Network (LIN), a Media Oriented Systems Transport (MOST) network, a FlexRay™ compatible network, and other types of networks. Although in some embodiments a specific type of network is described, it should be noted that the invention is not restricted to a specific type of network and is not restricted to in-vehicle networks (IVNs).

Figure 1:
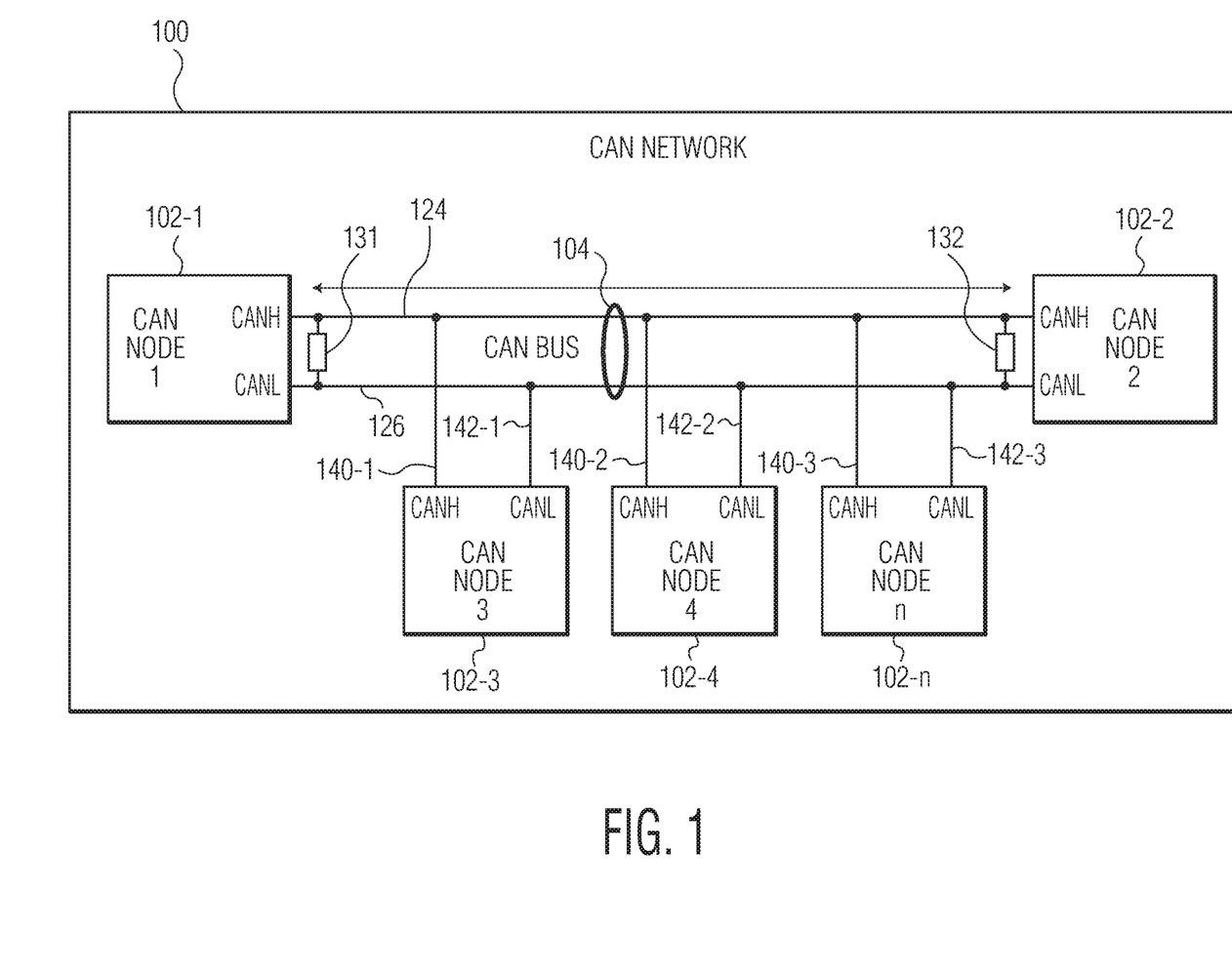
FIG. 1 depicts a CAN network that includes multiple CAN nodes connected to a CAN bus.

FIG. 1 depicts a CAN network 100 that includes multiple CAN nodes 102-1, 102-2, 102-3, 102-4, 102-n (where n is a positive integer), also referred to as "ECUs," each connected to a CAN bus 104. The CAN bus 104 carries analog differential signals and includes a CAN high (CANH) bus line/wire 124 and a CAN low (CANL) bus line/wire 126. The CAN bus is known in the field. In some embodiments, the CAN bus lines 124 and 126 form a twisted-pair cable having a nominal cable impedance. In some embodiments, the nominal cable impedance is 120Ω or other suitable impedance value within a specific range (e.g., between 50Ω and 130Ω), which is typical of some automotive applications of the CAN bus. It will however be appreciated that embodiments are applicable to other line impedances and the present application should not be understood to be limited to a specific nominal cable impedance. It will also be appreciated that the exact impedance of the CAN bus may be affected by physical factors such as the cable and/or isolation material. While CAN bus line impedance is assumed to be a specific impedance value a specific range (e.g., between 50Ω and 130Ω), the actual CAN bus impedance may vary around this value and can be considered to be approximately (e.g., ±5%) the specific impedance value. Although the CAN network is shown in FIG. 1 as including five CAN nodes, in other embodiments, the CAN network includes less than five CAN nodes or more than five CAN nodes.

The CAN node 102-1 has a termination resistor 131 corresponding to the nominal cable impedance. The CAN node 102-2 has a termination resistor 132 corresponding to the nominal cable impedance. Termination resistances of the termination resistors may vary as to their exact value due to real-world implementation. Each of the CAN nodes 102-3, 102-4, 102-n is coupled to the CANH bus line 124 and the CANL bus line 126 via tap lines/wires 140-1, 140-2, 140-3, 142-1, 142-2, 142-3. The CAN node 102-3, 102-4, 102-n are intermediate nodes that may be un-terminated or optionally applied with a high ohmic termination in the kilo-Ohms range in some systems. In some examples, high ohmic termination may provide limited ringing suppression at these quasi open ends of the cable, but the effectiveness is very limited due to the deviation from the nominal cable impedance.

Figure 2:
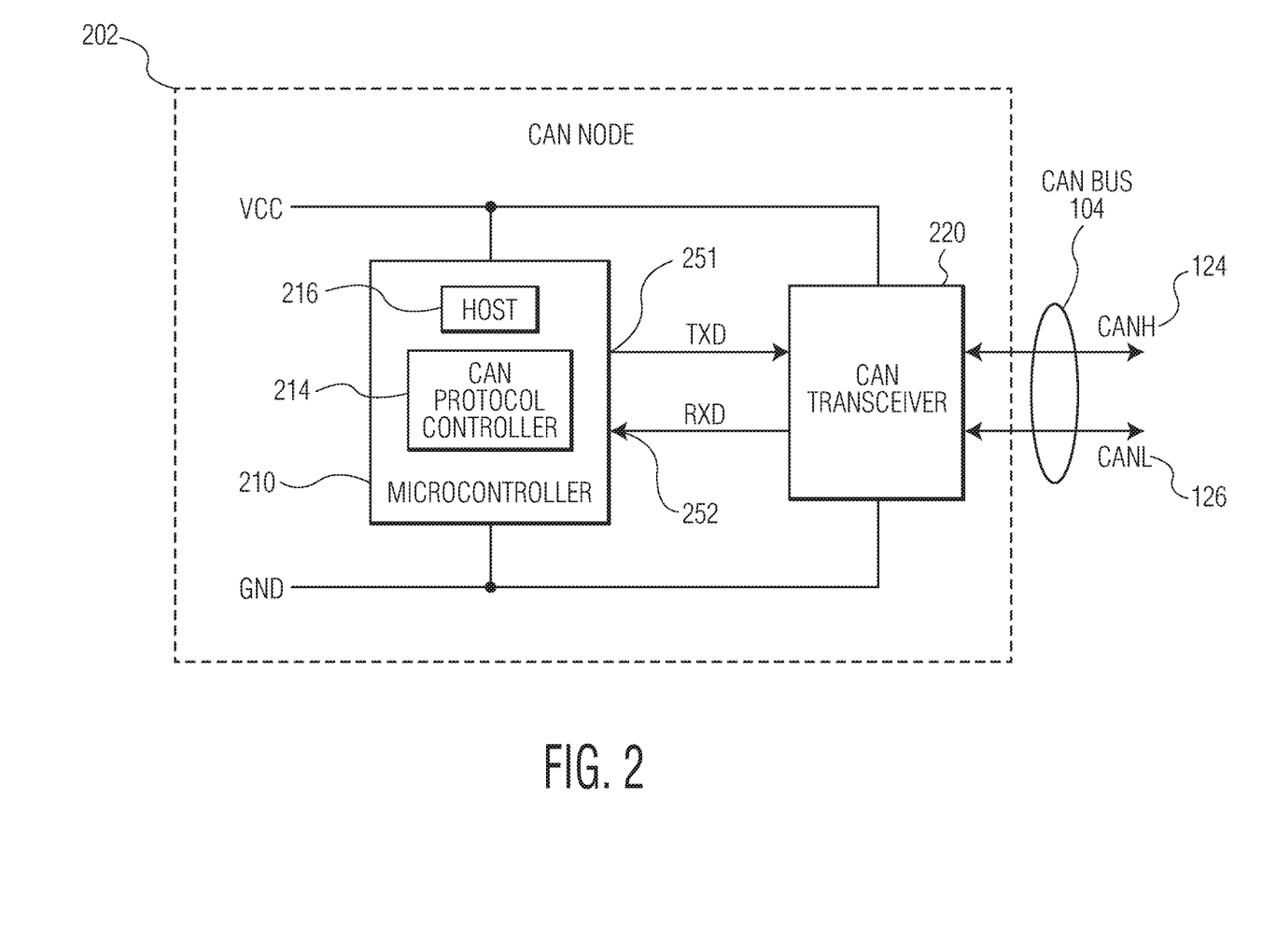
FIG. 2 depicts an embodiment of one of the CAN nodes of the CAN bus network depicted in FIG. 1.

FIG. 2 depicts an embodiment of one of the CAN nodes 102 of the CAN network 100 depicted in FIG. 1. In the embodiment of FIG. 2, a CAN node 202 includes a microcontroller 210 having an embedded CAN protocol controller 214 and a CAN transceiver 220. In some embodiments, the microcontroller may also include a host 216, which may be, for example, a software application that is stored in memory of the microcontroller and executed by processing circuits of the microcontroller. The microcontroller and the CAN transceiver of the CAN node may be connected between a supply voltage, $V_{CC}$, and ground, GND. The CAN node 202 depicted in FIG. 2 is a possible implementation of one of the CAN nodes 102 depicted in FIG. 1. However, the CAN nodes depicted in FIG. 1 can be implemented differently from the CAN node depicted in FIG. 2.

The microcontroller 210 is typically connected to at least one device (not shown) such as a sensor, an actuator, or some other control device and is programmed to interpret the received messages and to generate appropriate outgoing messages. The microcontroller, also referred to as a host processor, a host, or a digital signal processor (DSP), is known in the field. The CAN protocol controller 214, which can be embedded within the microcontroller or external to the microcontroller (e.g., a separate IC device), implements data link layer operations as is known in the field. For example, in receive operations, the CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN data frame format to the CAN transceiver.

The CAN transceiver 220 is located between the microcontroller 210 and the CAN bus 104 and implements physical layer operations. For example, in receive operations, the CAN transceiver converts analog differential signals from the CAN bus to serial digital signals that the CAN protocol controller 214 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

As illustrated in FIG. 2, data communicated from the microcontroller 210 to the CAN transceiver 220 is identified as transmit data (TXD) and data communicated from the CAN transceiver to the microcontroller is referred to as receive data (RXD). The CAN bus transceiver is connected to the microcontroller via a TXD path 251 and a RXD path 252. Specifically, TXD is carried on the TXD path and RXD is carried on the RXD path. Data is communicated to and from the CAN bus via the CANH and CANL bus lines 124 and 126, respectively. As noted above, the CAN protocol controller can be configured to support the normal mode or the flexible data rate mode. As used herein, "CAN normal mode" (also referred to as "Classical CAN mode") refers to frames that are formatted according to the ISO 11898-1: 2003 standard and "CAN FD mode" refers to frames that are formatted according to the International Standard 11898-1: 2015 standard, or an equivalent thereof. In some embodiments, the CAN node is coupled to the CAN bus through one or more tap lines. In other embodiments, the CAN node is coupled directed to the CAN bus wires 124 and 126.

In some embodiments, the microcontroller 210 determines messages that are to be transmitted on the CAN bus 104 and provides these to the CAN protocol controller 214. The microcontroller may receive messages from the CAN transceiver 220 and interpret the received messages. The CAN protocol controller may receive bits from the CAN bus (via the CAN transceiver) and reconstruct the bits into a message to be interpreted by the microcontroller. The CAN controller may receive a message from the microcontroller and provide the message as serial bits to the bus via the CAN transceiver. The CAN transceiver may convert the digital data bits on the TXD path 251 from the CAN protocol controller into analog bus signals. The CAN transceiver may convert analog bus signals into digital bits to be provided via the RXD path 252 to the CAN protocol controller.

Figure 3:
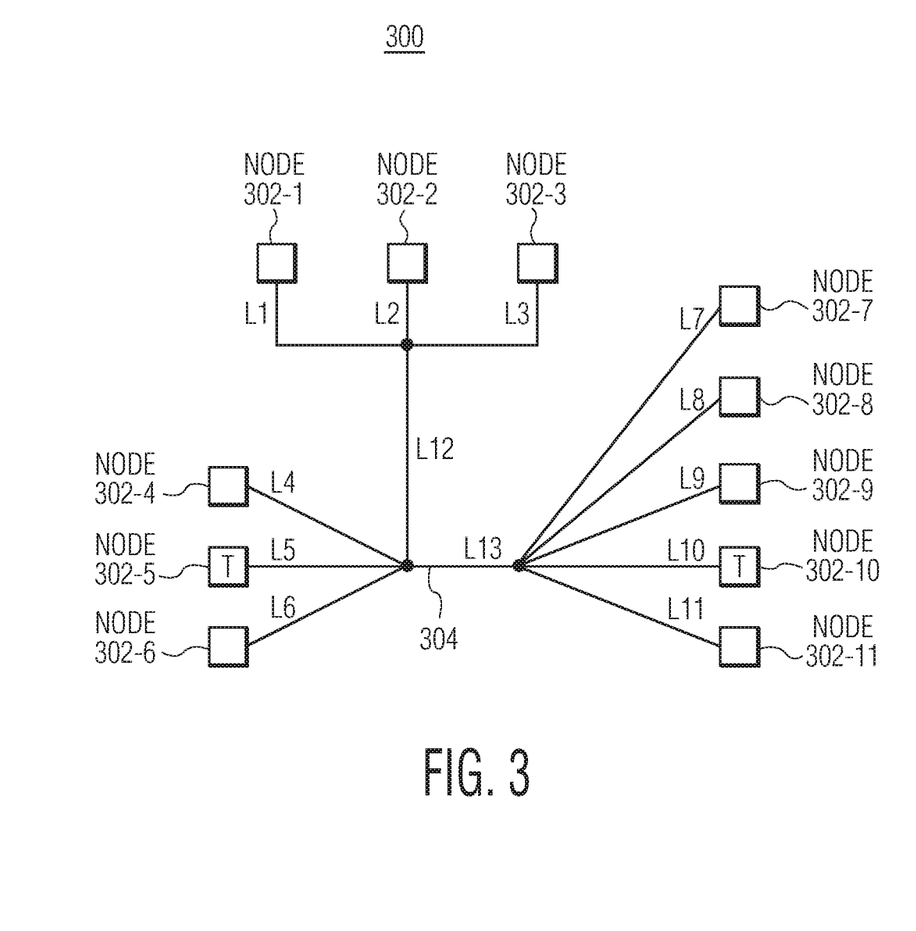
FIG. 3 depicts a block diagram of an exemplary scenario of a CAN network having eleven CAN nodes coupled together via a CAN bus.

FIG. 3 depicts a block diagram of an exemplary scenario of a CAN network 300 having eleven CAN nodes 302-1, 302-2, 302-3, 302-4, 302-5, 302-6, 302-7, 302-8, 302-9, 302-10, 302-11 coupled together via a CAN bus 304 with cables having lengths, "L1," "L2," "L3," "L4," "L5," "L6," "L7," "L8," "L9," "L10," "L11," "L12," "L13." Herein the CAN bus and tap lines thereof are shown as solid lines indicative of the aforementioned single twisted-pair cable. The CAN node 302-5 and the CAN node 302-10 should be considered to form the respective CAN nodes of the CAN bus. Each of the CAN node 302-5 and the CAN node 302-10 has a termination resistance $R_{Term}$ "T" according to the nominal cable impedance such as 120Ω. When, for instance, one of the CAN nodes 302-1, 302-2, 302-3, 302-4, 302-7, 302-8 or 302-11 that is further away from the termination resistors at the CAN nodes 302-5 and 302-10 (exemplary tap line lengths are indicated in FIG. 3) starts sending data, reflections in the network may cause signal disturbances. In general, reflections in the CAN bus network may be caused by the open tap lines and the star points in the CAN cable harness regardless which CAN node is sending data (including terminated CAN nodes 302-5 and 302-10). A CAN FD controller may sample the bus, for instance, at 70% of bit time. If the duration of the signal disturbance is longer than the typical sampling time, erroneous bit information may be captured, which may result in a corrupted data message. By using a longer bit time, the problem of signal disturbance may be mitigated. However, the maximum data transmission rate of the network may be reduced. Reflections due to tap lines that are too long are a limiting factor for transmission rate when using network topologies developed for the classic CAN protocol at a transmission rate of, e.g., 500 kb/s, also for the more recent CAN FD protocol, which specifies transmission data rates from 1 MBit/s to 5 MBit/s or even higher. Further, it should be considered that even with a well-terminated network, high capacitance bus loading may also negatively impact the transmission rate. In the case of a high number of CAN nodes connected to the CAN bus network, the dominant to recessive transitions becomes very slow. Besides the capacitive impact, the cable impedance may vary with temperature resulting in a non-matched bus termination which again causes reflections even at the terminated ends of a CAN network. In the recessive state the transmitter is high ohmic. When each connected node adds a capacitance of, for instance, a maximum of 100 pF to the CAN bus and the CAN bus impedance is fixed at 60Ω, the dominant to recessive transition will not be faster than approximately 100 ns in the case of a network to which ten nodes are connected. The more CAN nodes are connected to the CAN bus lines, the higher the overall capacitance will be and the longer the recessive bit transition will take. For complex topologies, the successful recessive bit transition reaching a reliable recessive bit level at all nodes may take several 100 ns up to e.g. 1 μs including all ringing effects. If it is desirable to have a transmission rate of 5 MBit/s or higher, the bit time is 200 ns, which may be shorter than the bit transition time and may cause communication failures.

Under typical signal reflection/ringing conditions, the implementation of the CAN network 100 may be limited by certain parameters in order to reduce signal reflection/ringing and to protect the integrity of the signaled data at higher data rates. For example, the CAN bus 104 may have a maximum length at which maximum data rates may be achieved. In another example, the tap lines 140, 142 connecting the CAN nodes 102 to the CAN bus may be kept as short as possible to reduce reflections. However, the length of the bus and the tap lines may be subject to other factors and it may not always be possible to have tap lines that are as short as desired. For example, in an automotive application, the implementation of the CAN bus network may be governed by the shape and size of a vehicle and the position of the CAN nodes. Furthermore, even in the case where the tap lines are as short as is practical, ringing may still occur at higher data rates. The signal reflection/ringing in the un-terminated tap lines may corrupt the communication on the CAN bus, which can become more of a problem with CAN FD protocols where the data rate is higher. One way to address ringing is to redesign the network topology to improve termination, which can be time consuming and costly. Typically, the maximum bus length is determined by, or rather is a trade-off with the selected signaling rate and the signaling rate decreases as the transmission distance increases. While steady-state losses may become a factor at the longest transmission distances, the main factors limiting signaling rate as distance is increased are time varying. Cable bandwidth limitations, which degrade the signal transition time and introduce inter-symbol interference (ISI), are primary factors reducing the achievable signaling rate when transmission distance is increased. For a CAN bus, the signaling rate is also determined from the total system delay—down and back between the two most distant nodes of a system and the sum of the delays into and out of the nodes on a bus with the typical, e.g., 5.5 ns/m, propagation delay of a twisted-pair cable. Also, consideration should be given the signal amplitude loss due to impedance of the cable and the input transceiver impedance. Since tap lines are un-terminated, signal reflections can develop in a tap line that drive signal levels back and forth across a receiver's input thresholds, creating errors. Bit-sampling occurs near the end of a bit, so it is desirable that all signal reflections in a CAN tap line be attenuated before or during the propagation delay segment to provide an adequate margin of safety.

Embodiment of the present invention provide techniques for reducing/suppressing signal reflection/ringing that may be implemented on CAN network and CAN FD network topologies to suppress signal disturbances and to improve the signal quality. In accordance with an embodiment of the invention, a transition of a CAN transceiver of the CAN device from a dominant state to a recessive state is detected and in response to detecting a transition of the CAN transceiver from the dominant state to the recessive state, an output impedance of the CAN transceiver is controlled to be within a predefined range of an impedance value at the dominant state while a differential driver voltage on a CAN bus connected to the CAN transceiver decreases to a predefined voltage. For example, the output impedance of the CAN transceiver may be controlled to be within a certain percentage above or below the impedance value at the dominant state (e.g., ±5%, ±10% or within other suitable value range of the impedance value at the dominant state) while the differential driver voltage on the CAN bus decreases to the predefined voltage. The transition of the CAN transceiver of the CAN device from the dominant state to the recessive state may be detected by monitoring a transmit data connection (TXD) signal received at the CAN transceiver and identifying a signal edge of the TXD signal.

By controlling the output impedance of the CAN transceiver low ohmic (e.g., be within a certain percentage above or below the impedance value at the dominant state) during the ramping down of the differential driver voltage, the energy dissipated into the CAN network can be reduced, resulting in lower reflection on the CAN bus. The CAN bus reflection suppression technique is independent of the CAN bus topology and CAN bus data speed and can be applied to various CAN bus topologies and CAN bus data speeds.

Figure 4:
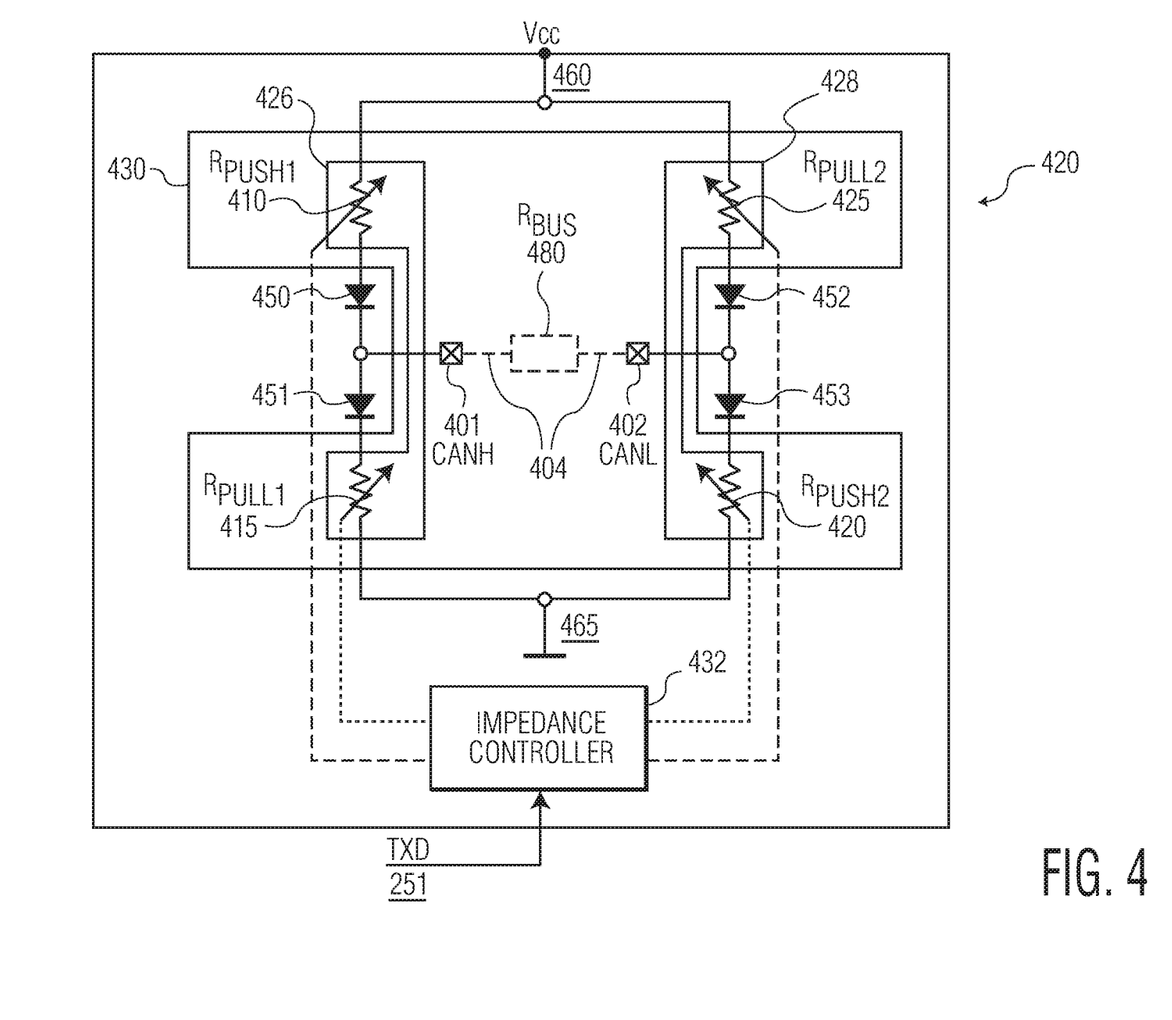
FIG. 4 depicts an embodiment of a CAN transceiver of the CAN node depicted in FIG. 2.

FIG. 4 depicts an embodiment of the CAN transceiver 220 of the CAN node 202 depicted in FIG. 2. In the embodiment of FIG. 4, a CAN transceiver 420 includes an impedance bridge 430 and an impedance controller 432 configured to control the impedance bridge. By controlling the impedance bridge of the CAN transceiver (e.g., based on the transmit data connection (TXD) signal received from the TXD path 251), the impedance of the CAN transceiver can be adjusted independently of the signal response at the CAN bus 404. Consequently, the signal reflection/ringing at the CAN bus can be reduced or suppressed through the controlled impedance. The CAN transceiver 420 depicted in FIG. 4 is a possible implementation of the CAN transceiver 220 depicted in FIG. 2. However, the CAN transceiver depicted in FIG. 2 can be implemented differently from the CAN transceiver depicted in FIG. 4.

In the embodiment depicted in FIG. 4, the impedance bridge 430 is connected to CANH and CANL terminals 401, 402, which in turn are coupled to tap lines 140 or 142 (in the embodiment shown in FIG. 1), respectively, and further to the CANH bus wire 124 and CANL bus wire 126 (in the embodiment shown in FIG. 1). The impedance bridge includes a first leg 426, which is also referred to as CANH (side) leg, and a second leg 428, which is also referred to as CANL (side) leg. Each leg includes two controllable impedances with impedance properties (e.g., adjustable capacitors, adjustable resistors, and/or adjustable inductors), which can be dynamically adjustable for instance by the impedance controller 432. The CANH leg includes a push impedance unit 410 (e.g., implemented as a push resistor $R_{PUSH1}$), which is connected between a common voltage supply rail $V_{CC}$ 460 and the CANH terminal 401, and a pull impedance unit 415 (e.g., implemented as a pull resistor $R_{PULL1}$), which is connected between the CANH terminal 401 and a common ground rail 465. The CANL leg includes a pull impedance unit 425 (e.g., implemented as a pull resistor $R_{PULL2}$), which is connected between the common voltage supply rail $V_{CC}$ and the CANL terminal, and a push impedance unit 420 (e.g., implemented as a push resistor $R_{PUSH2}$), which is connected between the CANL terminal 402 and the common ground rail. Although the impedance units 410, 415, 420,425 are implemented as resistors in the embodiments shown in FIG. 4, in other embodiments, at least one of the impedance units 410, 415, 420,425 may be implemented as one or more transistors (MOSFET transistors or bipolar transistors), one or more adjustable capacitors, one or more adjustable inductors, or a combination of one or more adjustable resistors, one or more capacitors, and/or one or more adjustable inductors. In some embodiments, at least one of the push resistors, $R_{PUSH1}$ and $R_{PUSH2}$, and the pull resistors, $R_{PULL1}$ and $R_{PULL2}$, is implemented as a resistor ladder or other adjustable resistor network and the impedance controller 432 can adjust the resistance value of at least one of the push resistors, $R_{PUSH1}$ and $R_{PUSH2}$, and the pull resistors, $R_{PULL1}$ and $R_{PULL2}$, (e.g., by controlling switches (e.g., MOSFET transistors or other active semiconductor devices) within a resistor ladder or other adjustable resistor network to connect or bypass a resistor component). The legs may have a symmetrical resistor configuration with respect to the CANH and CANL terminals. The CAN bus 404 has a load impedance 480 represented by the equivalent bus impedance, $R_{BUS}$. Typically, the bus impedance $R_{BUS}$ has an impedance of approximately 60Ω in accordance with the above described typical nominal cable impedance of 120Ω provided that the CAN bus is terminated with termination resistance $R_{Term}$=120Ω at each end. In some embodiments, diodes 450, 451, 452, 453 may be connected in series with each of the impedance units 410, 415, 420, 425 in order to prevent reverse currents from flowing from the CAN bus into the common voltage supply rail and into the common ground rail in the case that a bus voltage that is higher than the supply voltage potential $V_{CC}$ is present on the common voltage supply rail or a bus voltage that is lower than a ground potential is present on the common ground rail. In some embodiments, other schemes are used to prevent reverse currents flowing from the CAN bus into the common voltage supply rail and into the common ground, e.g., a diode in series with the common supply rail 460 and a diode in series with the common ground rail 465.

In some embodiments, the impedance values of the adjustable push resistors $R_{PUSH1}$ and $R_{PUSH2}$ and the adjustable pull resistors $R_{PULL1}$ and $R_{PULL2}$ are dynamically adjustable based on two parameters x and y. The domain of the parameter x may comprise the value range x=(0, 1), where x=(0, 1)={x ∈R, 0<<x<1}, and the domain of the parameter y may comprise the value range y=(0, 2], where y=(0, 2]={y ∈ R, 0<y≤2}. The parameters x and y are independent of each other. The push impedance value $Z_{PUSH}$ of the push resistors $R_{PUSH1}$ and $R_{PUSH2}$ can be expressed as:

$$Z_{PUSH} = \frac{R_f}{x \cdot y} \qquad (1)$$

where Rf represents a reference resistance value. The pull impedance value $Z_{PULL}$ of the adjustable pull resistors $R_{PULL1}$ and $R_{PULL2}$ can be expressed as:

$$Z_{PULL} = \frac{R_f}{(1-x) \cdot y} \qquad (2)$$

The total differential impedance of the impedance bridge 430, which is also the driver impedance $Z_{CAN}$ of the CAN transceiver 420, can be expressed as:

$$Z_{CAN} = 2 \cdot \frac{1}{\frac{1}{Z_{PUSH}} + \frac{1}{Z_{PULL}}} \qquad (3)$$

$$Z_{CAN} = 2 \cdot \frac{R_f}{y} \qquad (4)$$

The total differential impedance of the impedance bridge 430, which is the driver impedance, $Z_{CAN}$, of the CAN transceiver 420, can be dynamically adjusted to any impedance value between a low ohmic state, which is herein determined by a lowest driver impedance value $Z_{CAN}=R_f$, and a high ohmic state, which is herein represented by $Z_{CAN}=\infty$. $R_f$ is the minimum drive impedance value of the CAN transceiver 420. For instance, the minimum drive impedance value may be $R_f=15\Omega$. It should be noted that a high ohmic state, referred herein by $Z_{CAN}=\infty$, may comprise a maximum drive impedance value in the range of kilo Ohms or mega Ohms. The driver impedance, $Z_{CAN}$, needs to be high ohmic compared to the equivalent bus impedance, $R_{BUS}$, in order to allow the differential bus impedance to reach the nominal value of e.g. 60 Ohms again at the end of a slow bit time. Consequently, the factor between the maximum drive impedance and the minimum drive impedance may in the range of e.g., thousand or more.

The impedance controller may be implemented as a processor, such as a microcontroller. In some embodiments, the impedance controller includes a signal edge detector. In some embodiments, the impedance controller 432 is configured to detect a transition of the CAN transceiver 420 from a dominant state to a recessive state and in response to detecting a transition of the CAN transceiver from the dominant state to the recessive state, control an output impedance of the impedance bridge (e.g., the impedance measured between the CANH and CANL terminals 401, 402) to be within a certain percentage above or below the impedance value at the dominant state (e.g., by simultaneously adjusting the impedance configuration of the push resistors, $R_{PUSH1}$ and $R_{PUSH2}$, and the pull resistors, $R_{PULL1}$ and $R_{PULL2}$ such that the output impedance of the impedance bridge to be within a certain percentage above or below the impedance value at the dominant state while the differential output voltage decreases to a predefined voltage) while the differential driver voltage on the CAN bus 404 (e.g., the different voltage measured between the CANH and CANL terminals 401, 402) connected to the CAN transceiver decreases to a predefined voltage (e.g., 0V or other suitable voltage level). For example, the output impedance of the CAN transceiver may be controlled to be ±5%, ±10% or within other suitable value range of the impedance value at the dominant state while the differential driver voltage on the CAN bus decreases to the predefined voltage. In some embodiments, the output impedance of the CAN transceiver is controlled to be at a fixed impedance while the differential output voltage decreases to a predefined voltage. By controlling the output impedance of the CAN transceiver to be within a certain percentage above or below the impedance value at the dominant state during the ramping down of the differential driver voltage, the energy dissipated into the CAN network can be reduced, resulting in lower reflection on the CAN bus, under various CAN bus topologies and data speeds. The impedance controller may detect the transition of the CAN transceiver from the dominant state to the recessive state by monitoring the transmit data connection (TXD) signal received from the TXD path 251 at the CAN transceiver (e.g., from the microcontroller 210). For example, the impedance controller may detect the transition of the CAN transceiver from the dominant state to the recessive state by identifying a signal edge of the TXD signal. An active CAN transceiver (i.e., a CAN transceiver in the dominant state) drives the CAN bus waveform to a "dominant" state, represented as a logic low level (logic zero) of the TXD signal. An inactive CAN transceiver (i.e., a CAN transceiver in the recessive state) removes its differential output voltage from the CAN bus, represented as a logic high level (logic one) of the TXD signal. Although specific logic levels of the TXD signal are described, in other networks, other signal logic levels may be used. In some embodiments, the impedance controller is configured to control the resistance values of the adjustable push resistors, $R_{PUSH1}$ and $R_{PUSH2}$, and the adjustable pull resistors, $R_{PULL1}$ and $R_{PULL2}$, of the impedance bridge while the differential driver voltage on the CAN bus connected to the CAN transceiver decreases to the predefined voltage. In an embodiment, during a positive/rising or negative/falling signal edge of the TXD signal, the impedance controller may adjust the resistance values of one or more of the adjustable push resistors, $R_{PUSH1}$ and $R_{PUSH2}$, and the adjustable pull resistors, $R_{PULL1}$ and $R_{PULL2}$. For example, during a dominant (falling) edge of the TXD signal, the impedance controller may adjust the resistance values of the adjustable push resistors, $R_{PUSH1}$ and $R_{PUSH2}$, while keep the resistance values of the adjustable pull resistors, $R_{PULL1}$ and $R_{PULL2}$, static high ohmic to be within a certain percentage above or below the impedance value at the dominant state. In another example, during a recessive (rising) edge of the TXD signal, the impedance controller may adjust the resistance value of each of the adjustable push resistors, $R_{PUSH1}$ and $R_{PUSH2}$, and the adjustable pull resistors, $R_{PULL1}$ and $R_{PULL2}$, individually with different slopes in order to keep the overall impedance of the impedance bridge to be within a certain percentage above or below the impedance value at the dominant state.

In some embodiments, the impedance controller 432 is configured to increase the output impedance of the CAN transceiver 420 (e.g., the impedance measured between the CANH and CANL terminals 401, 402) while the differential driver voltage on the CAN bus 404 (e.g., the different voltage measured between the CANH and CANL terminals 401, 402) is kept at the predefined voltage. Because the CAN bus voltage is kept at the predefined voltage (e.g., 0V) while the output impedance of the CAN transceiver is increased, the impedance change will not result in large amount of energy dissipating into the CAN network and thus reduce or prevent a new reflection on the CAN bus. For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the impedance controller can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). The impedance controller may increase the output impedance of the CAN transceiver to be equal to a characteristic impedance of the CAN bus or to a predefined impedance value that is close to characteristic impedance of the CAN bus (e.g., ±5%, ±10% or within other suitable value range of the characteristic impedance of the CAN bus) while the differential driver voltage on the CAN bus is kept at the predefined voltage. In some embodiments, the impedance controller increases the output impedance of the CAN transceiver to be equal to a characteristic impedance of the CAN bus or to a predefined impedance value that is lower or higher than the characteristic impedance of the CAN bus before a data sample point to avoid data sample error. In some embodiments, the impedance controller increases the output impedance of the CAN transceiver to be equal to a characteristic impedance of the CAN bus while the differential driver voltage on the CAN bus is kept at the predefined voltage and subsequently, increases the output impedance of the CAN transceiver from the characteristic impedance of the CAN bus to a high ohmic value while the differential driver voltage on the CAN bus is kept at the predefined voltage.

Figure 5:
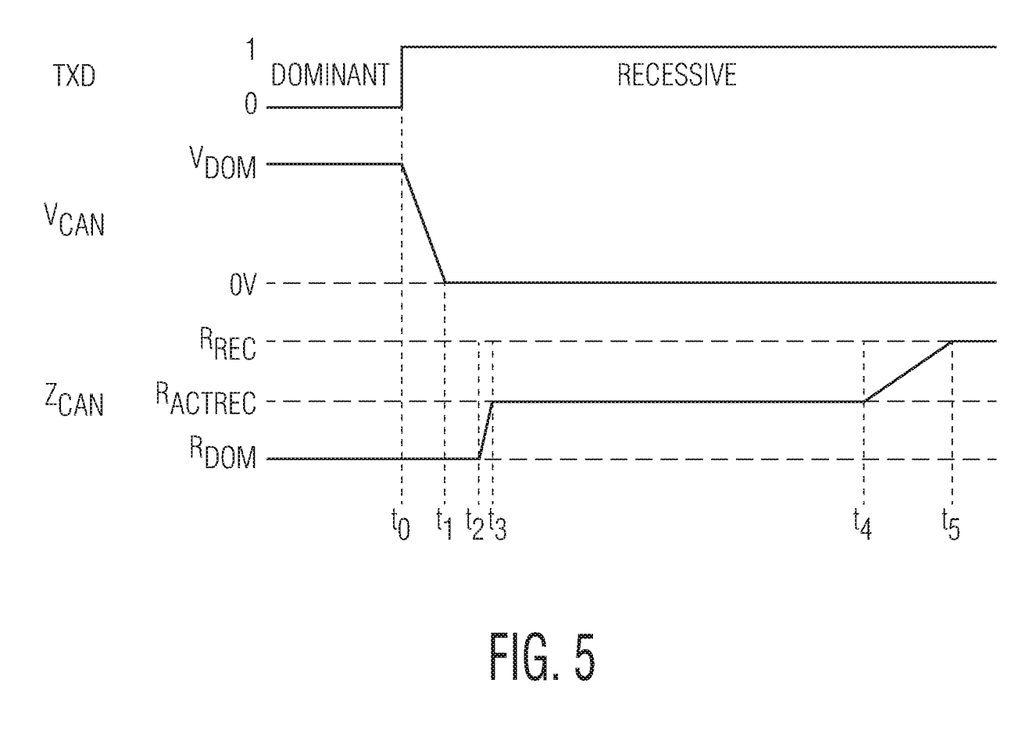
FIG. 5 illustrates a signal timing diagram of the CAN transceiver depicted in FIG. 4.

FIG. 5 illustrates a signal timing diagram of the CAN transceiver 420 depicted in FIG. 4. In the signal timing diagram illustrated in FIG. 5, the driver impedance, "$Z_{CAN}$," of the impedance bridge 430 (e.g., the impedance measured between the CANH and CANL terminals 401, 402). is controlled by the impedance controller 432 to switch between a dominant impedance level, "$R_{DOM}$," an active recessive impedance level, "$R_{ACTREC}$," and a recessive impedance level, "$R_{REC}$." The impedance values of $R_{DOm}$, $R_{ACTREC}$, and/or $R_{REC}$ may be determined based on the impedance value of the CAN bus 404. For example, if the impedance of the CAN bus is 120 ohm, the impedance value of $R_{DOM}$ may be set to 30 ohm while the impedance value of $R_{ACTREC}$ may be set to the same impedance value of the CAN bus, which is 120 ohm. The impedance value of $R_{REC}$ may be set to indefinite ($\infty$), may comprise a maximum drive impedance value in the range of kilo Ohms or mega Ohms. In an operation, the CAN protocol controller 214 of the CAN node 202 (shown in FIG. 2) provides a serial bit stream to the CAN transceiver 420 for transmission on the CAN bus. The impedance controller 432 monitors signal transitions/edges on this bit stream on the TXD path 251 and adjusts the impedance value of the impedance bridge accordingly.

At time point, $t_0$, the TXD signal on the TXD path 251 transitions from low to high, which causes a dominant to recessive transition of the differential driver voltage $V_{CAN}$ on the CAN bus 404 (e.g., the different voltage measured between the CANH and CANL terminals 401, 402). It will be appreciated that the low to high transition of TXD signal on the TXD path 251 may not immediately cause a change on the CAN bus voltage $V_{CAN}$ because there may be a delay as the TXD signal on the TXD path 251 is received by the CAN transceiver and converted to a voltage level for the CAN bus. In the dominant state, the impedance controller 432 controls the push resistors, $R_{PUSH1}$ and $R_{PUSH2}$, to stay at a dominant impedance level (e.g., 15Ω) and the pull resistors, $R_{PULL1}$ and $R_{PULL2}$, to stay high ohmic, which results in a low ohmic driver impedance, $Z_{CAN}$, that is at the dominant impedance level, $R_{DOM}$ (e.g., 30Ω).

In response to the detection of the dominant to recessive transition at time point, $t_0$, the impedance controller 432 controls the push resistors, $R_{PUSH1}$ and $R_{PUSH2}$, and the pull resistors, $R_{PULL1}$ and $R_{PULL2}$, to control the driver impedance, $Z_{CAN}$, unchanged. For example, between time point, $t_0$, and time point, $t_1$, the resistance value of each of the push resistors, $R_{PUSH1}$ and $R_{PUSH2}$, and the pull resistors, $R_{PULL1}$ and $R_{PULL2}$, is changed that the CAN bus voltage, $V_{CAN}$, ramps from $V_{DOM}$ to zero while the driver impedance, $Z_{CAN}$, stays constant. The impedance controller may gradually increase the resistance values of the push resistors, $R_{PUSH1}$ and $R_{PUSH2}$, from one value (e.g., 15 Ohms) to a higher value (e.g., 30 Ohms) while decrease the resistance values of the pull resistors, $R_{PULL1}$ and $R_{PULL2}$, from "infinite" to a certain value (30 Ohms). At the time point, $t_1$, the resistance values of the push resistors, $R_{PUSH1}$ and $R_{PUSH2}$, and the pull resistors, $R_{PULL1}$ and $R_{PULL2}$, may be identifiable to each other, while the driver impedance, $Z_{CAN}$, stays constant. At time point, $t_1$, the CAN bus voltage, $V_{CAN}$, reaches the recessive state (0V) and the impedance controller controls the driver impedance, $Z_{CAN}$, unchanged from the impedance value of the driver impedance, $Z_{CAN}$, at time point, $t_0$. After the CAN bus voltage, $V_{CAN}$, reaches the recessive state (0V), the impedance controller controls the driver impedance, $Z_{CAN}$, unchanged for another time duration. By controlling the driver impedance, $Z_{CAN}$, unchanged during the ramping down of the CAN bus voltage, $V_{CAN}$, the energy dissipated into the CAN network can be reduced, resulting in lower reflection on the CAN bus 404.

At time point, $t_2$, the impedance controller 432 begins to increase the driver impedance, $Z_{CAN}$, from the low ohmic impedance of $R_{DOM}$, to a higher value until time point, $t_3$.

For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the impedance controller can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). At time point, $t_3$, the driver impedance, $Z_{CAN}$, reaches the active recessive impedance level, $R_{ACTREC}$, which may be adapted to the characteristic impedance of the CAN network cable (e.g. 120 ohm) or any other suitable value. Because the CAN bus voltage, $V_{CAN}$, is kept at 0V while the driver impedance, $Z_{CAN}$, is increased, the impedance change will not result in large amount of energy dissipating into the CAN network and thus reduce or prevent a new reflection on the CAN bus 404. The adjustment of the driver impedance, $Z_{CAN}$, may be performed continuously over time and may be increased at a constant change rate. In some embodiments, the constant change rate of the driver impedance, $Z_{CAN}$, is set to be lower than a predefined value to gradually increase the driver impedance, $Z_{CAN}$. The impedance controller can adjust the driver impedance, $Z_{CAN}$, by controlling the push resistors, $R_{PUSH1}$ and $R_{PUSH2}$, and the pull resistors, $R_{Pull1}$ and $R_{Pull2}$, to increase their impedances from a starting push impedance (e.g., $Z_{CAN}$=30Ω) to a target push impedance (e.g., $Z_{CAN}$=120Ω). In some embodiments, the impedance controller increases the impedances of the push resistors, $R_{PUSH1}$ and $R_{PUSH2}$, and the pull resistors, $R_{Pull1}$ and $R_{Pull2}$, continuously over time at a constant change rate. In some embodiments, the time duration between time point, t1, and time point, t2, is zero.

The reflection on the CAN bus 404 is suppressed up to time point, $t_4$. The longer the time duration between time point, $t_0$, and time point, $t_4$ is, the better the ringing suppression performance will be. At time point, $t_4$, the impedance controller 432 begins to increase the driver impedance, $Z_{CAN}$, from the active recessive impedance level, $R_{ACTREC}$, to a higher value until time point, $t_5$. At time point, $t_5$, the driver impedance, $Z_{CAN}$, reaches the recessive impedance level, $R_{REC}$. In some embodiments, the time during between time point, $t_4$, and time point, $t_5$, is above a certain time duration to reduce or prevent additional energy from dissipating into the CAN network in case the bus voltage is not zero at time point, t4. For example, the bus voltage may not be zero at time point, t4, if another transmitter is also driving the bus dominant, e.g., during arbitration or when an error frame is transmitted. The threshold time duration between t4 and t5 depends on the network topology complexity.

Figure 6:
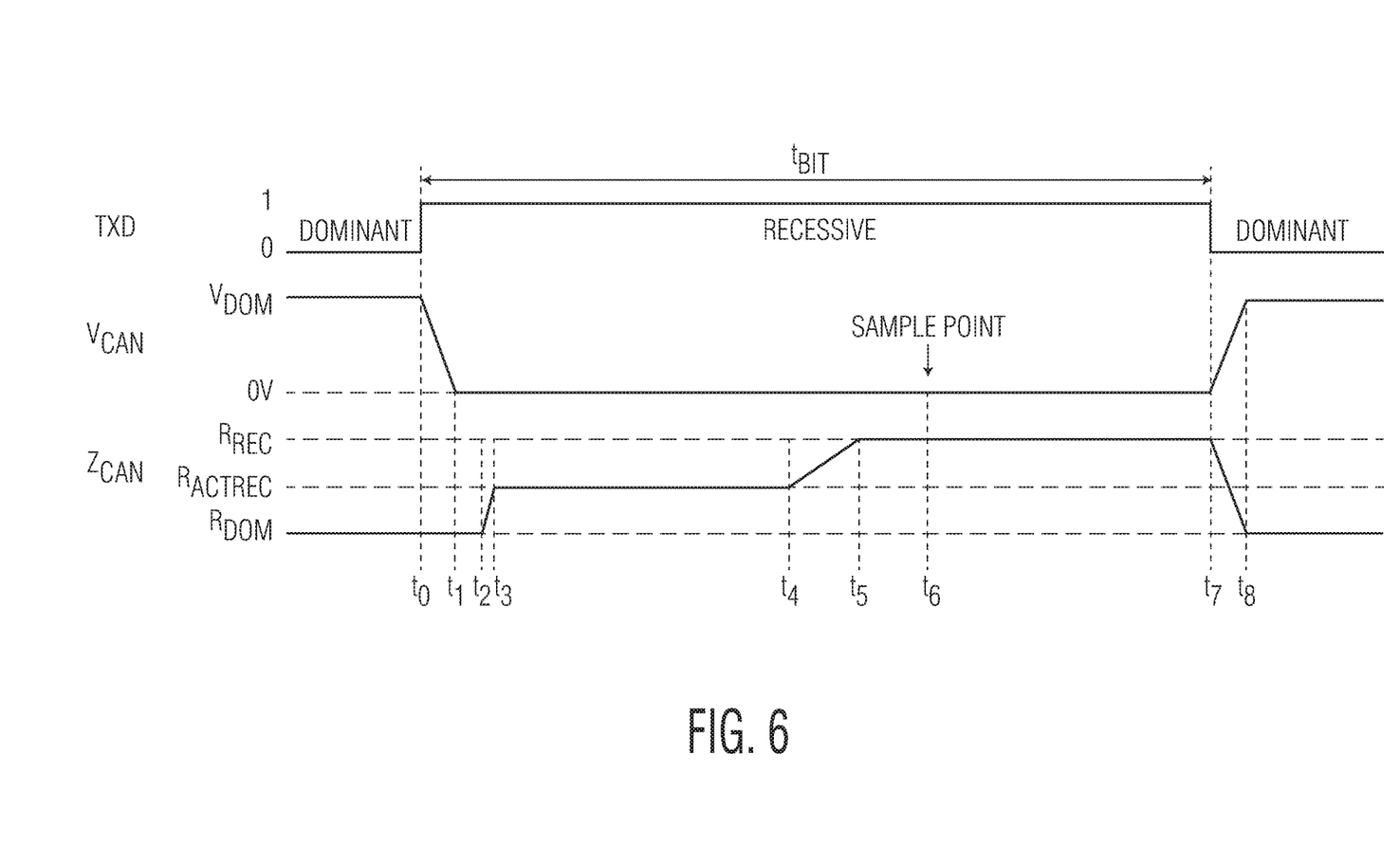
FIG. 6 illustrates an extension of the signal timing diagram of the CAN transceiver depicted in FIG. 4 during a CAN arbitration phase or a data phase with low baud rate.

FIG. 6 illustrates an extension of the signal timing diagram of the CAN transceiver 420 depicted in FIG. 4 during a CAN arbitration phase or a data phase with low baud rate. The arbitration bit rate of the CAN network 100 depends on the network complexity. In some embodiments, the arbitration bit rate of the CAN network 100 is lower than 1 Mbps (e.g., 500 kbps (tbit=2 us) or lower). The CAN protocol controller 214 may have a sample point at a certain percentage (typically 60%-80%) of the arbitration bit time. At time point, $t_6$, CAN data is sampled while the driver impedance, $Z_{CAN}$, is high ohmic (recessive), indicating that the arbitration process is not affected when one or more other CAN transmitters are still dominant on the CAN bus 404. Beginning from time point, t7, through time point, t8, the CAN transceiver transitions from recessive to dominant for the next bit period.

Figure 7:
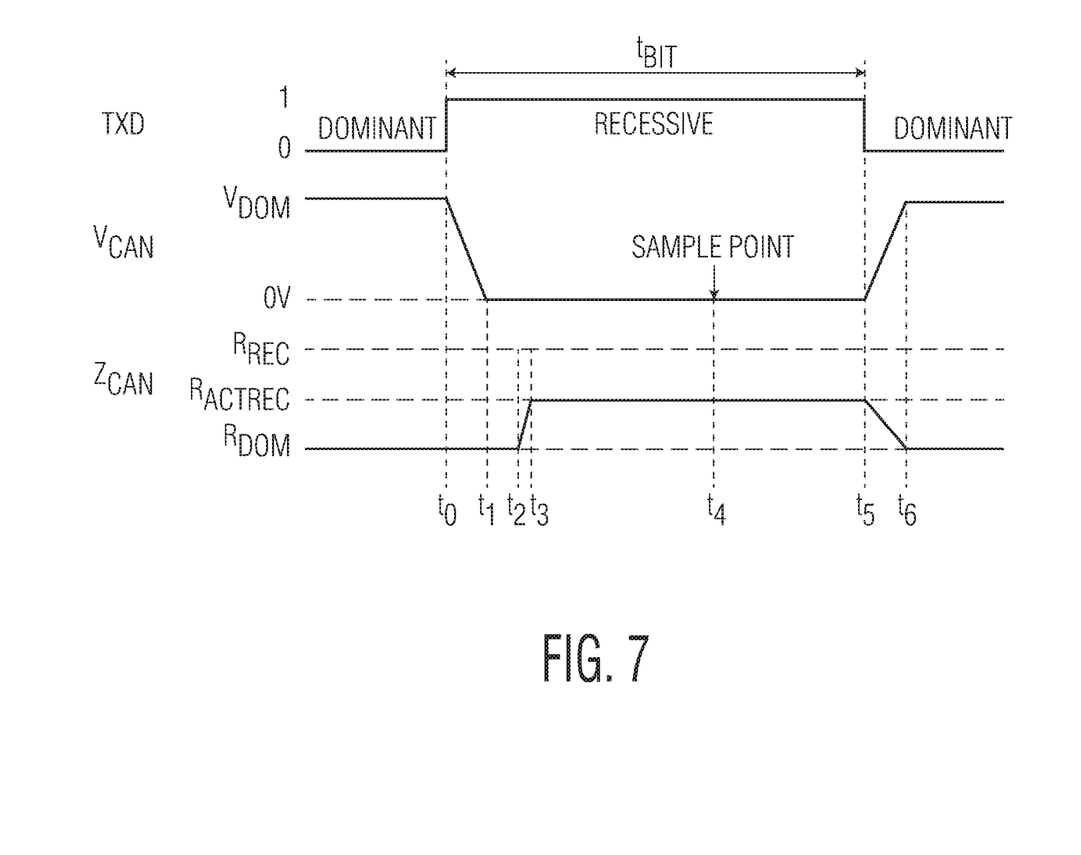
FIG. 7 illustrates a signal timing diagram of the CAN transceiver depicted in FIG. 4 during a high data rate phase.

FIG. 7 illustrates a signal timing diagram of the CAN transceiver 420 depicted in FIG. 4 during a high data rate phase (e.g., the data-phase of 5 Mbps). In the signal timing diagram illustrated in FIG. 7, the driver impedance, $Z_{CAN}$, of the impedance bridge 430 is controlled by the impedance controller 432 to switch between the dominant impedance level, $R_{DOM}$, and the active recessive impedance level, $R_{ACTREC}$. In an operation, the CAN protocol controller 214 of the CAN node 202 (shown in FIG. 2) provides a serial bit stream to the CAN transceiver 420 for transmission on the CAN bus. The impedance controller 432 monitors signal transitions/edges on this bit stream at the TXD path 251 and adjusts the impedance value of the impedance bridge accordingly.

The signal timing diagram illustrated in FIG. 7 at time points $t_0$-$t_3$ is identical to the signal timing diagram illustrated in FIG. 5 at time points $t_0$-$t_3$. The reflection on the CAN bus 404 is suppressed up to time point, $t_5$. The longer time the duration between time point, $t_0$, and time point, $t_5$ is, the better the ringing suppression performance will be. At time point, $t_4$, CAN data is sampled while the driver impedance, $Z_{CAN}$, is the active recessive impedance level, $R_{ACTREC}$, indicating that the error management process is not affected when one or more other CAN transmitters are driving a dominant error frame on the CAN bus. At time point, $t_5$, the TXD signal at the TXD path 251 transitions from recessive to dominant and the impedance controller 432 begins to decrease the driver impedance, $Z_{CAN}$, from the active recessive impedance level, $R_{ACTREC}$, to a lower value until time point, $t_6$. At time point, $t_6$, the driver impedance, $Z_{CAN}$, reaches the dominant impedance level, $R_{DOM}$, (e.g. $Z_{CAN}$=30 ohm). The active recessive phase may be longer than the minimum bit time of the data-phase and the transition from active recessive to recessive may be skipped. For example, if the arbitration bit-rate is 500 kbps (tbit=2 us) and the data-phase bit-rate is 5 Mbps (tbit=200 ns), the active recessive phase is allowed to be longer than 200 ns, as long as the active recessive phase is short enough to such that the TXD signal is recessive during the sample point of the arbitration bit (e.g., 60% of 2 us=1.2 us). In essence, instead of the data-phase bit-rate, the arbitration bit-rate decides the maximum duration of the ringing suppression.

In an embodiment, the impedance values of $R_{DOM}$ and $R_{ACTREC}$ may be determined based on the impedance value of the CAN bus 404. For example, if the impedance of the CAN bus is 120 ohm, the impedance value of $R_{DOM}$ may be set to 30 ohm while the impedance value of $R_{ACTREC}$ may be set to lower than the impedance value of the CAN bus, which is 120 ohm. The CAN protocol requires that a single CAN node in the CAN bus network is able to overdrive (e.g., by asserting a dominant voltage on the CAN bus) a recessive bit of another sender at any time if an error is detected. As such, the dominant driver voltage of the CAN node for signaling the detected error has to be stronger than the active recessive driver voltage of other CAN nodes in the same CAN bus network. When a CAN transmitter asserts dominance in the CAN bus during the data-phase, the total bus impedance will be lower since the active recessive output impedance of the transmitter is in parallel with the CAN bus load. For example, the minimum network impedance seen by a transceiver is 50 ohm and the transmitter is able to drive 1.5V at this minimum impedance of 50 ohm (specified in ISO 11898-2:2016), which means the transmitter sources a minimum current of 30 mA into the bus (1.5V/50 Ohms=30 mA). The CAN node asserting active recessive on the CAN bus should be overdriven with the dominant state, meaning the bus voltage at that CAN node should be above 0.9V (maximum receiver threshold specified in ISO 11898-2: 2016). The minimum bus impedance should be above 0.9V/ 30 mA=30 ohm. The active recessive impedance is in parallel with the bus load of 50 ohm and should be a minimum of 1/(1/30−1/50)=75 ohm. Since only one CAN node is transmitting active recessive during the data-phase, the dominant level transmitted by one or more nodes during an error frame can be reliably detected.

Figure 8:
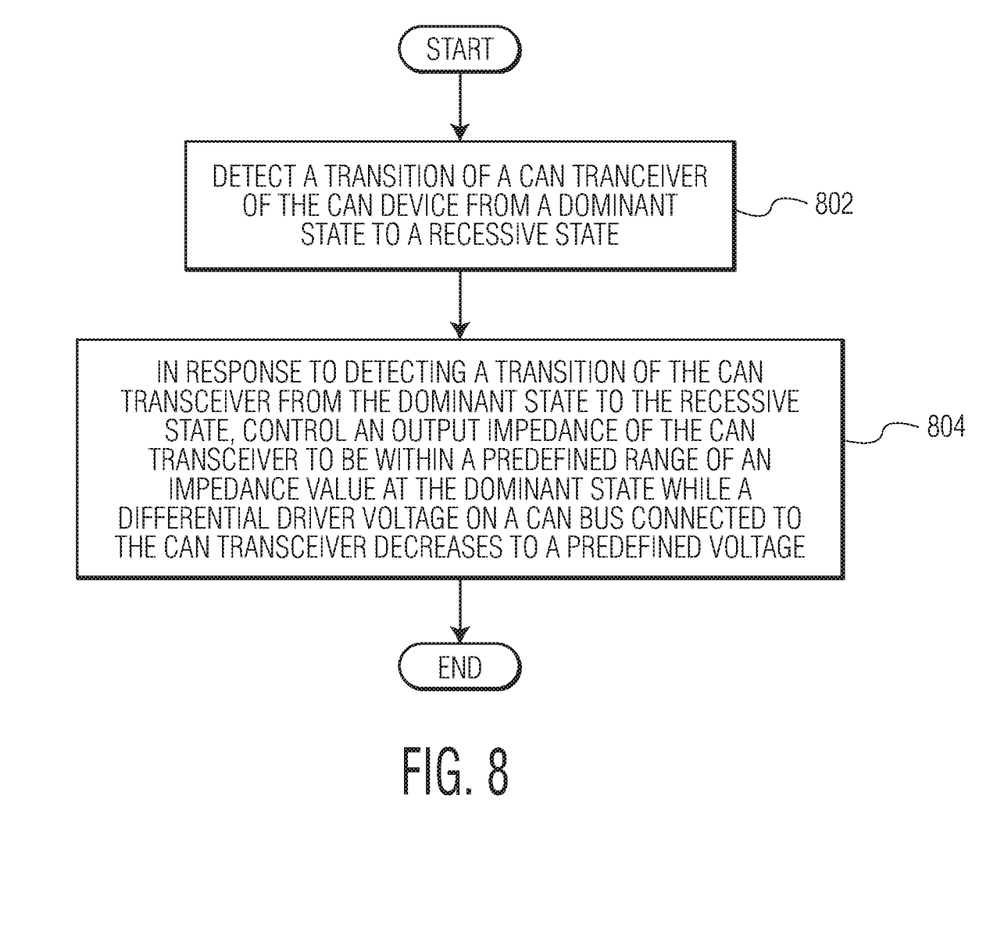
FIG. 8 is a process flow diagram of a method for operating a CAN device in accordance with an embodiment of the invention.

FIG. 8 is a process flow diagram of a method for operating a CAN device in accordance with an embodiment of the invention. At block 802, a transition of a CAN transceiver of the CAN device from a dominant state to a recessive state is detected. At block 804, in response to detecting a transition of the CAN transceiver from the dominant state to the recessive state, an output impedance of the CAN transceiver is controlled to be within a predefined range of an impedance value at the dominant state while a differential driver voltage on a CAN bus connected to the CAN transceiver decreases to a predefined voltage. The CAN device may be the same as or similar to the CAN node 102 depicted in FIG. 1, the CAN node 202 depicted in FIG. 2, and/or the CAN node 302 depicted in FIG. 3. The CAN transceiver may be the same as or similar to the CAN transceiver 220 depicted in FIG. 2 and/or the CAN transceiver 420 depicted in FIG. 4.

Techniques described herein can be applied to any type of networks, including a CAN, a LIN, a MOST network, a FlexRay™ compatible network, and other types of networks. Although in some embodiments a CAN device is described, it should be noted that the invention is not restricted to CAN devices. In an embodiment, the above-described techniques can be applicable to CAN, CAN-FD, and ISO 11898 compliant networks. The above-described techniques can be implemented in a CAN device such as a CAN transceiver IC device, a system chip, an Application Specific Integrated Circuit (ASIC)/Customer Specific Integrated Circuit (CSIC) device, a microcontroller IC device, or an IC device that includes both a CAN transceiver and a microcontroller.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a Controller Area Network (CAN) device, the method comprising:
    detecting a transition of a CAN transceiver of the CAN device from a dominant state to a recessive state; and
    in response to detecting a transition of the CAN transceiver from the dominant state to the recessive state, controlling an output impedance of the CAN transceiver to be within a predefined range of an impedance value at the dominant state while a differential driver voltage on a CAN bus connected to the CAN transceiver decreases to a predefined voltage, and subsequently after a non-zero time duration, increasing the output impedance of the CAN transceiver to a higher value while the differential driver voltage on the CAN bus connected to the CAN transceiver is kept at the predefined voltage.

2. The method of claim 1, wherein detecting a transition of the CAN transceiver from the dominant state to the recessive state comprises monitoring a transmit data connection (TXD) signal received at the CAN transceiver.

3. The method of claim 2, wherein monitoring the TXD signal received at the CAN transceiver comprises identifying a signal edge of the TXD signal.

4. The method of claim 2, wherein monitoring the TXD signal received at the CAN transceiver comprises receiving the TXD signal from a microcontroller within the CAN device.

5. The method of claim 1, wherein controlling the output impedance of the CAN transceiver to be within the predefined range of the impedance value at the dominant state while the differential driver voltage on the CAN bus connected to the CAN transceiver decreases to the predefined voltage comprises in response to detecting a transition of the CAN transceiver from the dominant state to the recessive state, increasing the output impedance of the CAN transceiver to be equal to the impedance value at the dominant state while the differential driver voltage on the CAN bus decreases to the predefined voltage.

6. The method of claim 1, wherein controlling the output impedance of the CAN transceiver to be within the predefined range of the impedance value at the dominant state while the differential driver voltage on the CAN bus connected to the CAN transceiver decreases to the predefined voltage comprises in response to detecting a transition of the CAN transceiver from the dominant state to the recessive state, controlling an impedance of an impedance bridge within the CAN transceiver to be within a predefined range of an impedance value at the dominant state while the differential driver voltage on the CAN bus decreases to the predefined voltage.

7. The method of claim 6, wherein controlling the impedance of the impedance bridge within the CAN transceiver to be within the predefined range of the impedance value at the dominant state while the differential driver voltage on the CAN bus decreases to the predefined voltage comprises in response to detecting a transition of the CAN transceiver from the dominant state to the recessive state, controlling resistance values of a plurality of adjustable push resistors and a plurality of adjustable pull resistors of the impedance bridge within the CAN transceiver to be within a predefined range of an impedance value at the dominant state while the differential driver voltage on the CAN bus decreases to the predefined voltage.

8. The method of claim 6, wherein the impedance bridge comprises two legs, and wherein each of the two legs comprises an adjustable pull resistor and an adjustable push resistor connected in series and to a respective one of two CAN bus terminals of the CAN transceiver.

9. The method of claim 6, wherein the impedance bridge comprises two legs, and wherein each of the two legs comprises an adjustable pull resistor and an adjustable push resistor connected in series between a voltage supply rail and a ground rail and to a respective one of two CAN bus terminals of the CAN transceiver.

10. The method of claim 1, wherein increasing the output impedance of the CAN transceiver to the higher value while the differential driver voltage on the CAN bus connected to the CAN transceiver is kept at the predefined voltage comprises increasing the output impedance of the CAN transceiver at a constant change rate while the differential driver voltage on the CAN bus connected to the CAN transceiver is kept at the predefined voltage.

11. The method of claim 10, wherein increasing the output impedance of the CAN transceiver while the differential driver voltage on the CAN bus connected to the CAN transceiver is kept at the predefined voltage comprises increasing the output impedance of the CAN transceiver to be equal to a characteristic impedance of the CAN bus or to a predefined impedance value while the differential driver voltage on the CAN bus is kept at the predefined voltage.

12. The method of claim 11, wherein increasing the output impedance of the CAN transceiver to be equal to the characteristic impedance of the CAN bus or to the predefined impedance value while the differential driver voltage on the CAN bus connected to the CAN transceiver is kept at the predefined voltage comprises increasing the output impedance of the CAN transceiver to be equal to the characteristic impedance of the CAN bus before a data sample point or to the predefined impedance value before the data sample point while the differential driver voltage on the CAN bus is kept at the predefined voltage.

13. The method of claim 10, wherein increasing the output impedance of the CAN transceiver while the differential driver voltage on the CAN bus connected to the CAN transceiver is kept at the predefined voltage comprises:
    increasing the output impedance of the CAN transceiver to be equal to a characteristic impedance of the CAN bus while the differential driver voltage on the CAN bus is kept at the predefined voltage; and
    subsequently, increasing the output impedance of the CAN transceiver from the characteristic impedance of the CAN bus while the differential driver voltage on the CAN bus is kept at the predefined voltage.

14. A Controller Area Network (CAN) device, the CAN device comprising:
    an impedance bridge connected to two CAN bus terminals of the CAN device; and
    an impedance controller connected to the impedance bridge, wherein the impedance controller is configured to:

detect a transition of a CAN transceiver of the CAN device from a dominant state to a recessive state; and in response to detecting a transition of the CAN transceiver from the dominant state to the recessive state, control an output impedance of the impedance bridge to be within a predefined range of an impedance value at the dominant state while a differential driver voltage on a CAN bus connected to the CAN transceiver decreases to a predefined voltage, and subsequently after a non-zero time duration, increase the output impedance of the CAN transceiver to a higher value while the differential driver voltage on the CAN bus connected to the CAN transceiver is kept at the predefined voltage.

15. The CAN device of claim 14, wherein the impedance controller is further configured to identify a signal edge of a transmit data connection (TXD) signal received at the CAN transceiver.

16. The CAN device of claim 14, wherein the impedance bridge comprises two legs, and wherein each of the two legs comprises an adjustable pull resistor and an adjustable push resistor connected in series between a voltage supply rail and a ground rail and to a respective one of the two CAN bus terminals.

17. The CAN device of claim 14, wherein the impedance controller is further configured to:
increase the output impedance of the impedance bridge to be equal to a characteristic impedance of the CAN bus while the differential driver voltage on the CAN bus is kept at the predefined voltage; and
subsequently, increase the output impedance of the impedance bridge from the characteristic impedance of the CAN bus while the differential driver voltage on the CAN bus is kept at the predefined voltage.

18. The CAN device of claim 14, wherein the impedance controller is further configured to increase the output impedance of the impedance bridge to be equal to a predefined impedance value that is with a certain range of a characteristic impedance of the CAN bus before a data sample point while the differential driver voltage on the CAN bus is kept at the predefined voltage.

19. A non-transitory computer-readable storage medium storing program instructions for operating a Controller Area Network (CAN) device, wherein execution of the program instructions by one or more processors of a computer system causes the one or more processors to perform steps comprising:

detecting a transition of a CAN transceiver of the CAN device from a dominant state to a recessive state; and in response to detecting a transition of the CAN transceiver from the dominant state to the recessive state, controlling an output impedance of the CAN transceiver to be within a predefined range of an impedance value at the dominant state while a differential driver voltage on a CAN bus connected to the CAN transceiver decreases to a predefined voltage, and subsequently after a non-zero time duration, increasing the output impedance of the CAN transceiver to a higher value while the differential driver voltage on the CAN bus connected to the CAN transceiver is kept at the predefined voltage.

* * * * *